United States Patent [19]

Miyagi et al.

[11] Patent Number: 4,784,477
[45] Date of Patent: Nov. 15, 1988

[54] ELECTROCHROMIC DEVICE USING TRANSITION METAL OXIDE AND METHOD OF PRODUCING SAME

[75] Inventors: Harutoshi Miyagi, Yokohama; Teruko Yoshimoto, Fujisawa, both of Japan

[73] Assignee: Nissan Motor Co., Ltd., Yokohama, Japan

[21] Appl. No.: 74,967

[22] Filed: Jul. 17, 1987

[30] Foreign Application Priority Data

Jul. 22, 1986 [JP] Japan .................. 61-170743

[51] Int. Cl.$^4$ .............................. G02F 1/01
[52] U.S. Cl. ................... 350/357
[58] Field of Search ............ 350/357; 252/408.1, 252/600; 340/785

[56] References Cited

U.S. PATENT DOCUMENTS

| | | | |
|---|---|---|---|
| 4,223,339 | 11/1980 | Leibowitz et al. | 350/357 |
| 4,348,077 | 9/1982 | Kondo et al. | 350/357 |
| 4,475,795 | 10/1984 | Leibowitz et al. | 350/357 |
| 4,565,860 | 1/1986 | Murofushi et al. | 528/422 |
| 4,645,307 | 2/1987 | Miyamoto et al. | 350/357 |

FOREIGN PATENT DOCUMENTS

| | | | |
|---|---|---|---|
| 0059324 | 4/1985 | Japan | 350/357 |
| 0084532 | 5/1985 | Japan | 350/357 |
| 62-37247 | 2/1987 | Japan | . |

OTHER PUBLICATIONS

Tetsuzo Yoshimura et al., "Effect of Surface States of WO$_3$ on the Operating Characteristics of Thin Film Electrochromic Devices", *Thin Solid Films*, 101 (1983) pp. 141–151.

Primary Examiner—Eugene R. LaRoche
Assistant Examiner—Nathan W. McCutcheon
Attorney, Agent, or Firm—Foley & Lardner, Schwartz, Jeffery, Schwaab, Mack, Blumenthal & Evans

[57] ABSTRACT

The invention relates to an electrochromic (EC) device having oppositely arranged two substrates at least one of which is transparent and each of which is coated with an electrode film on the inside surface, a first EC layer which is formed on the electrode film of one substrate and is formed of a transition metal oxide that takes on color in its electrochemically reduced state, such as WO$_3$, an opposite EC layer which is formed on the electrode film of the other substrate and is formed of another EC material, such as a polytriphenylamine that takes on color in its electrochemically oxidized state, and an electrolyte solution which uses a nonaqueous solvent and occupies the space between the two substrates. According to the invention, the transition metal oxide layer contains such an amount of adsorption water that the concentration of water in the electrolyte solution in the device becomes more than 0% and not more than 0.3% by weight. This is effective for enhancement of the durability of the transition metal oxide layer and also for improvements in the response characteristics of the metal oxide layer as an EC layer. The transition metal oxide layer is formed as a film by a usual deposition technique and then is immersed in a solution of an electrolyte in an organic solvent containing a suitable amount of water, which is usually not less than 0.5 vol % and not more than 30 vol %.

18 Claims, 2 Drawing Sheets

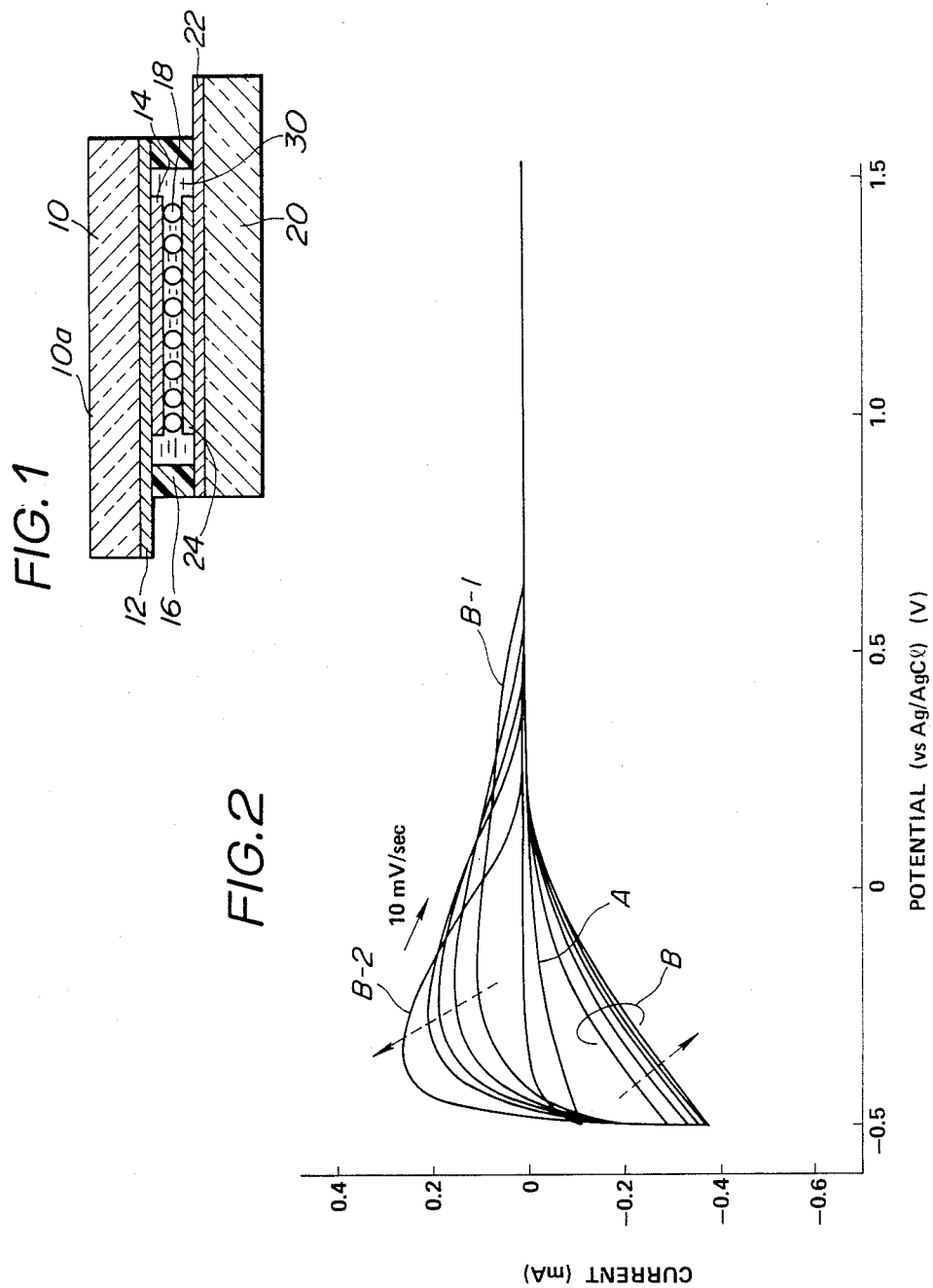

ELECTROCHROMIC DEVICE USING TRANSITION METAL OXIDE AND METHOD OF PRODUCING SAME

BACKGROUND OF THE INVENTION

This invention relates to an improved electrochromic device which utilizes a combination of a transition metal oxide that takes on color in its electrochemically reduced state and another electrochromic material that takes on color in its electrochemically oxidized state, and to a method of producing the same.

It is known to use a combination of the aforementioned two types of electrochromic (EC) materials in an EC device for display or other purposes. More particularly, such an EC device has oppositely arranged two electrode layers each of which is comprised of a electrode film deposited on a substrate and a coating layer of an EC material, and the two types of EC materials are assigned to the two electrode layers, respectively.

For example, as shown in JP-A No. 62-37247 (Feb. 18, 1987) which relates to an EC device for use as a variable reflectance nonglaring mirror, a transition metal oxide which is colorless in its electrochemically oxidized state and takes on a deep color by electrochemical reduction, such as $WO_3$, and a polymer of a conjugated compound, such as polytriphenylamine, which is colorless in its electrochemically reduced state and takes on color by electrochemical oxidation are used in combination. The space between the two EC electrode layers is filled with an electrolyte liquid such as a solution of lithium perchlorate in propylene carbonate. In operation of the EC device, electrochemical oxidation of the EC material of one electrode is accompanied by electrochemical reduction of the EC material of the opposite electrode. Accordingly simultaneous coloration of the two electrodes and simultaneous bleaching of the two electrodes take place. The primary purpose of this construction is intensifying coloration of the EC device.

In this type of EC devices it is usual to add a small quantity of water to the electrolyte solution using an organic solvent. As described, for example, in U.S. Pat. No. 4,348,077 the purpose of adding water is to enhance the speed of response of the transition metal oxide film to voltages applied thereto. However, the existence of a substantial amount of water in the electrolyte solution raises a problem that the transition metal oxide film gradually dissolves in the solution by the action of water and, therefore, undergoes a decrease in the qnantity of charge it acquires or delivers in electrochemical oxidation and reduction reactions. For this reason the EC devices are not yet satisfactory in durability.

SUMMARY OF THE INVENTION

It is an object of the present invention to provide an improved EC device, which utilizes a transition metal oxide as one of the aforementioned two types of EC materials and in which the transition metal oxide film is compatible with the electrolyte liquid and exhibits good response characteristics.

It is another object of the invention to provide a method of producing an EC device according to the invention.

We have accomplished the above object by causing the transition metal oxide film to occlude or adsorb a sufficient quantity of water in advance of assembling of the EC device and by using an electrolyte solution which is substantially free of water at the stage of introduction into the EC device.

More definitely, the present invention provides an electrochromic device comprising oppositely arranged first and second substrates at least one of which is transparent and each of which is coated with an electrode film such that the electrode film on the first substrate faces the electrode film on the second substrate, a first electrochromic layer which is laid on the electrode film on the first substrate and is formed of a first electrochromic material that takes on color in its electrochemically reduced state, a second electrochromic layer which is laid on the electrode film on the second substrate and is formed of a second electrochromic material, means for holding the first and second substrates spaced from each other and defining a closed space between the two substrates, and an electrolyte liquid which is a solution of a supporting electrolyte in a nonaqueous solvent and occupies said space, and the improvement according to the invention resides in that the first electrochromic material is a transition metal oxide containing such an amount of adsorption water that the concentration of water in the electrolyte liquid confined in the device becomes higher than 0% and not higher than 0.3% by weight.

The first electrochromic layer according to the invention is prepared by first depositing a film of transition metal oxide on the electrode film on the first substrate and then immersing the first substrate in a solution of an electrolyte in an organic liquid containing water to cause the transition metal oxide film to adsorb and occlude a sufficient quantity of water. Otherwise, known steps are employed for producing an electrochromic device according to the invention on condition that the electrolyte liquid is substantially free of water at the stage of introduction into the device.

In an EC device according to the invention, the electrolyte liquid does not contain water in the initial state. Although the transition metal oxide film exposed to the electrolyte liquid contains adsorption water, the concentration of water in the electrolyte liquid remains very low because of limited quantity of water which can transfer from the transition metal oxide into the electrolyte liquid. Therefore, the transition metal oxide does not dissolve in the electrolyte liquid during use or storage of the EC device, so that the EC device has remarkably improved durability. Furthermore, the transition metal oxide film containing adsorption water exhibits improved response characteristics as an EC electrode material and is particularly improved in the rate of bleaching or electrochemical oxidation reaction.

In this invention, $WO_3$ is preferred as the transition metal oxide, and a polymer of a conjugated compound such as a polytriphenylamine is preferred as the second electrochromic material, which takes on color in its electrochemically oxidized state.

As to the immersion of the transition metal oxide film in an electrolyte solution containing water, it is suitable that the content of water in the solution is not less than 0.5 vol % and not more than 30 vol %, and preferably in the range from 5 to 20 vol %. The content of water and the duration of immersion are interrelated, and the duration can be made shorter by raising the temperature of the solution.

BRIEF DESCRIPTION OF THE DRAWINGS

FIG. 1 is a sectional and schematic illustration of an EC display device as an embodiment of the invention;

FIG. 2 is a chart showing the electrochemical behavior of a $WO_3$ film in two electrolyte solutions one of which contains water and the other does not;

DETAILED DESCRIPTION OF THE INVENTION

Figure 3:
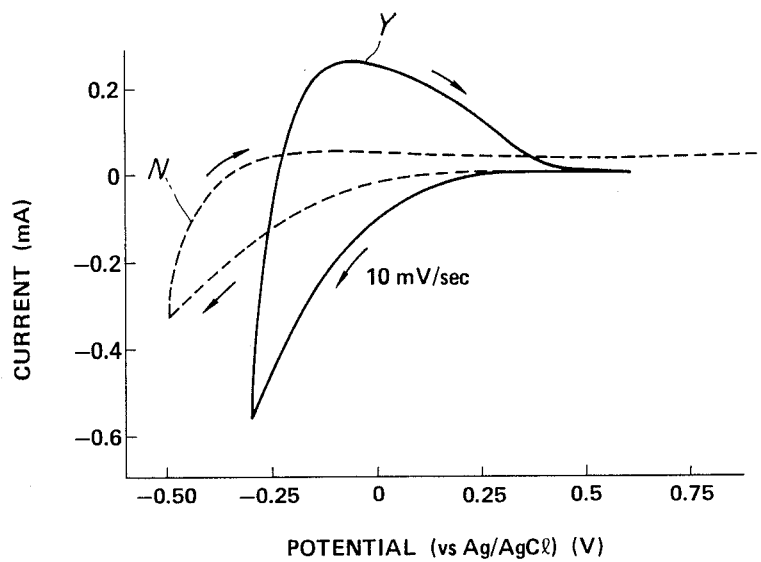
FIG. 3 is a chart showing the electrochemical behavior of a $WO_3$ film used in an example of the invention.

FIG. 1 shows a fundamental construction of an EC display device according to the invention. The display device has first and second substrates 10 and 20 both of which are transparent and usually made of glass. A transparent electrode film 12 such as an ITO (indium-tin-oxide) film is deposited on the inside surface of the first substrate 10, and a first EC layer 14 is formed, as a film, on the electrode film 12. For this layer 14 the EC material is a transition metal oxide which takes on color in its electrochemically reduced state. This metal oxide contains adsorption water. Another transparent electrode film 22 is deposited on the inside surface of the second substrate 20, and a second EC layer 24 is formed, as a film, on this electrode film 22. The second EC layer 24 is formed of an EC material that takes on color in its electrochemically oxidized state. A transparent spacer 16 such as tiny glass spheres is used to keep a predetermined short distance between the first and second EC layers 14 and 24. The two substrates 10 and 20 are held parallel to and spaced from each other by a thin layer 18 of a sealing material, which is applied at the periphery of the substrates 10, 20 so as to surround the EC layers 14, 24. The space defined between the two substrates 10 and 20 is filled with an electrolyte liquid 30.

Usually the combination of the two EC materials is selected such that the first EC layer 14 in electrochemically reduced state and the second EC layer 24 in electrochemically oxidized state assume nearly the same color. Then, the EC display device exhibits a fairly deep color by application of a voltage across the two electrodes 12 and 22 so as to make the first electrode 12 positive electrode and the second electrode 22 negative, and the display device becomes colorless and transparent by application of a reverse voltage.

In this invention $WO_3$ is preferred as the transition metal oxide of the first EC layer 14, though it is also possible to use, for example, $MoO_3$, $Nb_2O_5$, $V_2O_3$ or $TiO_2$. As the EC material of the second EC layer 24, a polymer of a conjugated compound represented by polytriphenylamine is preferred, though it is also possible to use a different organic EC material such as polypyrrole or polythiophene or an inorganic EC material such as NiOOH. As is well known $WO_3$ assumes a deep blue color in its electrochemically reduced state. Polytriphenylamines which become insoluble and are useful as EC materials are disclosed in U.S. Pat. No. 4,565,860. Such polytriphenylamines are colorless in the state as formed and assume deep blue color by electrochemical oxidation. The electrolyte liquid 30 is a solution of a supporting electrolyte such as, for example, $LiClO_4$, $LiBF_4$, $LiPF_6$, $KClO_4$, $KBF_4$ or $KPF_6$ in an organic solvent such as propylene carbonate, acetonitrile or dimethylformamide. In the present invention, water is not intentionally added to the organic solvent. However, the electrolyte liquid 30 confined in the EC display device contains a very small amount of water, not more than 0.3 wt %, since a portion of the adsorption water in the transition metal oxide of the first EC layer 14 transfers into the electrolyte liquid 30.

In the following description, $WO_3$ is taken as a representative of transition metal oxides which take on color in electrochemically reduced state.

In an electrolyte liquid containing a substantial amount of water, a film of $WO_3$ formed by vacuum deposition or an analogous technique gradually dissolves in the liquid and, therefore, becomes smaller in the quantity of charge it acquires or delivers in electrode reactions. In this regard it is desirable not to add water to the electrolyte liquid of an EC device having a thin EC layer formed of $WO_3$. However, when the electrolyte liquid does not contain water the $WO_3$ film is relatively slow in its response to voltages applied thereto. In this connection we conducted an experiment in the following manner.

A film of $WO_3$ having a thickness of about 3000 Å was formed by a vacuum deposition method on a glass substrate having a conductive coating film of ITO. The surface area of the $WO_3$ film was about 1.5 $cm^2$. Several samples were produced under the same conditions, and all the samples were stored in a desiccator for 4 months. After that a heat treatment was made on every $WO_3$ film sample at about 140° C. for 1 hr under reduced pressure of 30 cm Hg. This heat treatment temperature is close to the temperature employed for curing an epoxy resin as the material of the seal layer 18 in the EC display device shown in FIG. 1.

The electrochemical behavior of the heat-treated $WO_3$ film was examined in an electrolyte solution A which was 1 mol/liter solution of $LiClO_4$, in propylene carbonate and also in another electrolyte solution B which was prepared by adding 3 vol % of water to the solution A. The ITO film coated with the $WO_3$ film was tested as a working electrode by using a Pt wire as a counter electrode and a Ag/AgCl electrode as a reference electrode. In the test the potential at the $WO_3$/ITO electrode (vs Ag/AgCl electrode) was varied at a rate of 10 mV/sec while measuring the current produced. The test was carried out in nitrogen gas atmosphere. The results were as shown in FIG. 2, wherein the curve A represents the behavior of the $WO_3$ film in the electrolyte solution A not containing water and the curves B the behavior in the solution B containing water. As indicated by the curve A, when the electrolyte solution did not contain water the $WO_3$ film was very slow in the rate of oxidation reaction so that bleaching of the blue color developed by reduction was incomplete. In the electrolyte solution containing 3 vol % of water the behavior of the $WO_3$ film gradually changed as the scanning of the voltage was repeated many times, as indicated by the curves B. At the initial cycle represented by the curve B-1 the magnitude of the current produced was relatively small, and oxidation of the $WO_3$ film ended at a negative potential. However, as the oxidation and reduction were repeated the current gradually increased and the potential at the end of oxidation became more positive. The curve B-2 represents the oxidation and reduction reactions at the 17th cycle. From the result of the test in the electrolyte solution containing water it is presumed that the reactivity of the $WO_3$ film, which was initially low by reason of loss of moisture by the heat treatment, gradually rose as water contained in the solution was gradually absorbed in the $WO_3$ film. Therefore, it was thought that addition of water to the electrolyte solution would become unnecessary if it is possible to allow the $WO_3$ film to occlude water in a quantity sufficient to meet the requirement as to quickness of response to voltages applied threto in advance of heat treatment of the $WO_3$ film (curing of the seal layer 18 of the EC display device).

It is known that the response characteristics of a $WO_3$ film as an EC electrode material are affected by moisture contained in the film. In connection with this fact, there are some proposals of methods for obtaining a $WO_3$ film of improved response characteristics. Such proposals include forming a film of $H_xWO_3$ by reactive sputtering in the presence of $O_2$ and $H_2$ as reactive gases, and forming a $WO_3$ film by vacuum deposition with precise control of the degree of vacuum to an optimum level. Also it was propsed to expose a $WO_3$ film formed by a usual deposition method to a high humidity atmosphere (Thin Solid Films, 101, 141 (1983)). However, according to our verification experiments, $WO_3$ films formed by any of these methods hardly undergo oxidation and reduction reactions in an electrolyte solution not containing water when the fllms are subjected to the aforementioned heat treatment before testing in the electrolyte solution. The reason for such results has not been clarified, though it is presumed that the reactivity of the $WO_3$ film will depend seriously on either the quantity or the state of $H_2O$ existing in the $WO_3$ film.

According to the invention, a $WO_3$ film containing an adequate amount of adsorption water is obtained by first forming a $WO_3$ film on a substrate having a conductive coating film by a usual deposition method such as vacuum deposition or sputtering, then immersing the substrate carrying the $WO_3$ film in an electrolyte solution which uses a nonaqueous solvent and to which a limited amount of water is added and thereafter drying the liquid-treated $WO_3$ film.

EXAMPLE 1

An EC display device of the construction shown in FIG. 1 was produced by the following process.

A glass sheet was used as the transparent substrates 10 and 20, and each of the transparent electrode films 12 and 22 was a film of ITO.

The initial step of forming the first EC layer film 12 to a thickness of 3000 Å by vacuum deposition: pressure was $5\times10^{-5}$ Torr, substrate temperature was 80° C., rate of deposition was about 10 Å/sec. Next, the substrate 10 coated with the $WO_3$ film was kept immersed for 2 hr in 1 mol/liter solution of $LiClO_4$, in propylene carbonate containing 3 vol % of water. After that the coated substrate 10 was rinsed first with propylene carbonate and then with ethanol and dried by air blowing. After this treatment the $WO_3$ film 14 on the substrate 10 was subjected to heat treatment at 140° C. for 1 hr under reduced pressure of 30 cm Hg.

The material of the second EC layer 24 was a polymer of 4,4′-dichlorotriphenylamine, which was polymerized by using a Grignard reaction and had an average molecular weight of about 2000. As to the polymerization method, reference is made to U.S. Pat. No. 4,565,860. The polytriphenylamine was dissolved in chloroform in a concentration of 15 g/l, and the solution was applied to the surface of the transparent electrode film 22 on the second substrate 20 by a spin coating method. After drying and degassing the coating film, the substrate 20 was placed in a vessel filled with $I_2$ vapor and heated at 100° C. for 2 hr to thereby accomplish cross-linking of the polymer. The thus obtained polytriphenylamine film 24 had a thickness of about 1000 Å.

The second substrate 20 was placed the EC layer 24 upside, and a number of transparent glass spheres 16 having a diameter of 40 μm were distributed over the E layer 24 at a density of about 15 spheres per square centimeter. To form the seal layer 18, an epoxy resin base adhesive was applied by screen printing to the marginal regions of the transparent electrode film 12 on the first substrate 10 so as to leave an opening to be used for intake of the electrolyte liquid. Then the first substrate 10 carrying the EC layer 14 was placed on the second substrate 20, and the adhesive used as the material of the seal layer 18 was cured at about 140° C. under adequate pressure. The electrolyte liquid 30 was 1 mol/liter solution of $LiClO_4$, in propylene carbonate. The electrolyte liquid 30 was injected by the aforementioned opening in the seal layer 18 into the space in the EC device cell, and the opening was closed with the epoxy resin base adhesive.

In the thus produced EC display device, initially both the first EC layer 14 of $WO_3$ and the second EC Layer 24 of polytriphenylamine were colorless and transparent. When a voltage of about +1.0 V was applied to the second electrode 22 coated with the polytriphenylamine film 24 versus the first electrode 12 coated with the $WO_3$ film, both of the two EC layers 14, 24 took on color so that a deep blue color was exhibited over the entire display area of the display device. After that, rapid bleaching was accomplished by applying a voltage of about −0.4 V to the second electrode 22 (vs the first electrode 12).

In addition, several samples of the $WO_3$ film 14 were produced by repeating the vacuum deposition operation in the process of Example 1. Every $WO_3$ film sample was about 3000 Å in thickness and about 3.3 cm² in surface area. The samples were divided into two groups, and the first group of $WO_3$ films were treated with the solution of $LiClO_4$, in propylene carbonate containing 3 vol % of water in the same manner as in Example 1. The second group of $WO_3$ films were not subjected to this treatment. Then, the above described heat treatment (140° C.) was made on the sample $WO_3$ films of both the first and second groups. After that the electrochemical behavior of each $WO_3$ film sample was examined in 1 mol/liter solution of $LiClO_4$, in propylene carbonate. The ITO electrode coated with $WO_3$ film was tested as working electrode by using a Pt wire as the counter electrode and Ag/AgCl electrode as a reference electrode. In the test the potential at the $WO_3$/ITO electrode (vs Ag/AgCl electrode) was varied at a rate of 10 mV/sec while measuring the current produced. The test was carried out in a nitrogen gas atmosphere. The test results are shown in FIGS. 3 and 4.

Figure 4:
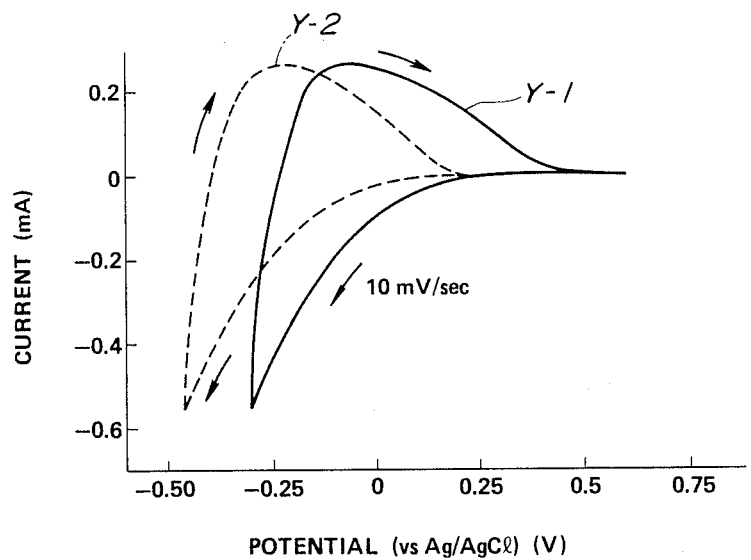
FIG. 4 is a chart showing a change in the electrochemical behavior of the $WO_3$ film in the above mentioned example observed after repeatedly driving the EC display device using the $WO_3$ film.

In FIG. 3 the curve N represents the behavior of the $WO_3$ film samples not treated with the electrolyte solution containing water. As is apparent, the untreated $WO_3$ film hardly underwent oxidation and reduction reactions. The curve Y represents the behavior of the $WO_3$ film samples treated with the solution containing water. As is apparent, the treated $WO_3$ film underwent oxidation and reduction reactions sufficiently and reversibly. On the $WO_3$ film samples of this group the cyclic reduction (coloration) and oxidation (bleaching) were continuosuly repeated to examine durability of each $WO_3$ film. In FIG. 4, the curve Y-1 is the cyclic voltamogram obtained at the initial cycle. That is, the curve Y-1 is a duplicate of the curve Y in FIG. 3. The curve Y-2 represents the behavior of the $WO_3$ film after repeating coloration and bleaching $7 \times 10^4$ times. As can be seen, there was little change in the degree of oxidation and reduction reactions, and the oxidation reaction (bleaching) did not significantly slow. Furthermore, there was no substantial change in the thickness of the $WO_3$ films subjected to the endurance test.

EXAMPLE 1A

Some samples of the $WO_3$ film 14 were produced by repeating the vacuum deposition operation in the process of Example 1. Most of these samples were immersed in a solution of $LiClO_4$, in propylene carbonate (PC) containing water. In this case the content of water in the solution and the duration of immersion were variable as shown in the following table. For a few samples, acetonitrile (AN) or dimethylformamide (DMF) was used as the solvent in place of propylene carbonate. For comparison, a few samples were immersed in water containing neither electrolyte nor organic solvent, and another few samples were immersed in propylene carbonate not containing electrolyte. The particulars are shown in the table. After that the $WO_3$ film samples were subjected to the heat treatment (140° C.) mentioned in Example 1 and then to the electrochemical evluation test described hereinbefore. The results are shown in the table.

In the table it is seen that the immersion of the $WO_3$ film in an electrolyte solution using an organic solvent and containing at least 0.5 vol % of water is effective. However, it is also seen that when the content of water in the solution is not less than 30 vol % the treated $WO_3$ film id damaged by significant dissolution of $WO_3$ itself.

Treatment of $WO_3$ Film with Solution Containing Water

| No. | Solute | Solvent | Content of $H_2O$ (vol %) | Immersion Time | Evaluation of Treated $WO_3$ Film |
|---|---|---|---|---|---|
| 1 | LiClO4 | PC | 0.5 | 9.0 | good |
| 2 | ibid | PC | 1.0 | 5.0 | good |
| 3 | ibid | PC | 5.0 | 1.0 | good |
| 4 | ibid | PC | 10.0 | 0.5 | good |
| 5 | ibid | PC | 20.0 | 0.5 | good |
| 6 | ibid | PC | 30.0 | 0.5 | became whitish and cloudy |
| 7 | ibid | PC | 40.0 | 0.5 | ibid |
| 8 | ibid | PC | 50.0 | 0.5 | partially dissolved |
| 9 | ibid | AN | 5.0 | 1.5 | good |
| 10 | ibid | DMF | 5.0 | 1.5 | good |
| 11 | — | water | 100.0 | 0.5 | partially dissolved |
| 12 | — | PC | 5.0 | 2.0 | bad |

EXAMPLE 2

The manufacturing process of Example 1 was modified only in that, in advance of forming the $WO_3$ film 14, Al was deposited by sputtering on the outer surface (10a in FIG. 1) of the first transparent substrate 10 to form a highly reflective film of Al having a thickness of 1500 Å. That is, the EC device produced in this example was for use as a nonglaring mirror of which reflectance can be controlled by applying a conrolled voltage across the first and second electrodes 12 and 22.

By evaluation testing the obtained EC device or nonglaring mirror proved to be equivalent to the electrochromic nonglaring mirrors disclosed in JP-A No. 62-37247 in the degrees of changes in reflectance, speed of response and temperature characteristics and to be appreciably improved in quickness of bleaching and also in durability.

In several samples of the EC devices of Examples 1 and 2, the content of water in the electrolyte liquid 30 was measured to be within the range from 0.05 to 0.3 wt %, though water was not added at the stage of preparing the electrolyte liquid and injecting it into the EC device cell.

What is claimed is:
1. A method of producing an electrochromic device, comprising the steps of:
   (a) providing first and second substrates at least one of which is transparent and each of which is coated with an electrode film;
   (b) depositing a film of a transition metal oxide which serves as an electrochromic material that takes on color in its electrochemically reduced state on the electrode film of the first substrate;
   (c) after step (b) immersing the first substrate in a solution of an electrolyte in an organic solvent containing water to cause the transition metal oxide film to adsorb water;
   (d) forming a film of another electrochromic material on the electrode film on the second substrate;
   (e) after steps (c) and (d) assembling the first and second substrates and a peripheral seal means into a blank cell in which the first and second substrates are held spaced from each other such that the film of the transition metal oxide faces the film of said another electrochromic material and in which a closed space is defined between the two substrates; and
   (f) injecting an electrolyte liquid which is a solution of a supporting electrolyte in a nonaqueous solvent substantially free of water into said space in said blank cell,
   the immersing step (c) being performed such that the treated film of the transition metal oxide contains such an amount of adsorption water that the concentration of water in said electrolyte liquid in the produced device becomes more than 0% and not more than 0.3% by weight.

2. A method according to claim 1, wherein the content of water in said solution at step (c) is not lower than 0.5 vol % and not higher than 30 vol %.

3. A method according to claim 2, wherein said content of water is in the range from 5 to 20 vol %.

4. A method according to claim 2, wherein said organic solvent in said solution at step (c) is selected from the group consisting of propylene carbonate, acetonitrile and dimethylformamide.

5. A method according to claim 2, wherein said electrolyte in said solution at step (c) is a lithium salt.

6. A method according to claim 1, wherein said transition metal oxide is $WO_3$.

7. A method according to claim 6, wherein said another electrochromic material is an electrochromic material that takes on color in its electrically oxidized state.

8. A method according to claim 7, wherein said another electrochromic material is a polymer of a conjugated compound.

9. A method according to claim 8, wherein said polymer is a polytriphenylamine.

10. An electrochromic device produced by the process according to claim 1.

11. An electrochromic device produced by the process according to claim 2.

12. An electrochromic device produced by the process according to claim 3.

13. An electrochromic device produced by the process according to claim 6.

14. An electrochromic device produced by the process according to claim 7.

15. An electrochromic device produced by the process according to claim 8.

16. An electrochromic device produced by the process according to claim 9.

17. An electrochromic device according to claim 10, wherein the process consists essentially of the recited steps.

18. A method according to claim 1, consisting essentially of the recited steps.

* * * * *